(12) United States Patent
Throssell et al.

(10) Patent No.: US 8,015,746 B2
(45) Date of Patent: Sep. 13, 2011

(54) DEVICE FOR CONNECTING TWO FISHING LINES

(75) Inventors: John Throssell, Williams Lake (CA); Dean Ibbitson, Williams Lake (CA)

(73) Assignee: John Throssell, Williams Lake (CA)

( * ) Notice: Subject to any disclaimer, the term of this patent is extended or adjusted under 35 U.S.C. 154(b) by 549 days.

(21) Appl. No.: 11/948,324

(22) Filed: Nov. 30, 2007

(65) Prior Publication Data
US 2009/0139131 A1 Jun. 4, 2009

(51) Int. Cl.
*A01K 91/04* (2006.01)
(52) U.S. Cl. ..................................... 43/42.74; 43/44.84
(58) Field of Classification Search .............. 43/42.74, 43/44.84, 44.85; *A01K 91/04*
See application file for complete search history.

(56) References Cited

U.S. PATENT DOCUMENTS

| 2,162,739 | A |   | 6/1939  | Mindek, Jr. |          |
|-----------|---|---|---------|-------------|----------|
| 2,201,351 | A |   | 5/1940  | Skoverski   |          |
| 2,223,922 | A |   | 12/1940 | Schofield   |          |
| 2,492,638 | A | * | 12/1949 | Hickson     | 43/42.74 |
| 2,577,143 | A |   | 12/1951 | Midland     |          |
| 2,592,741 | A | * | 4/1952  | Ristine     | 43/42.74 |
| 2,814,901 | A | * | 12/1957 | Suiter      | 43/42.74 |
| 3,363,355 | A |   | 1/1968  | Kellner     |          |
| 3,550,305 | A |   | 12/1970 | Santosuosso |          |
| 3,745,692 | A | * | 7/1973  | McGee       | 43/17.5  |
| 3,805,438 | A | * | 4/1974  | McLaughlin  | 43/42.74 |
| 3,943,652 | A |   | 3/1976  | Aunspaugh   |          |
| 4,998,374 | A | * | 3/1991  | Barnett     | 43/42.74 |
| 5,113,614 | A | * | 5/1992  | Morita      | 43/42.74 |
| 5,222,317 | A | * | 6/1993  | Georgescu   | 43/4     |
| 5,267,409 | A | * | 12/1993 | Voss        | 43/42.74 |
| 5,444,936 | A | * | 8/1995  | McDonald    | 43/42.74 |
| 5,797,209 | A | * | 8/1998  | Nicholas    | 43/4     |
| 6,000,166 | A | * | 12/1999 | Kirkpatrick | 43/42.74 |
| 6,618,980 | B1|   | 9/2003  | De Boer, Jr.|          |
| 6,862,838 | B1| * | 3/2005  | Gibbs       | 43/44.98 |
| 6,928,767 | B1|   | 8/2005  | Bolt        |          |
| 2008/0060254 | A1| * | 3/2008 | Bloomfield | 43/44.84 |

OTHER PUBLICATIONS

Godsil, H.C., The High Seas Tuna Fishery of California, Fish Bulletin No. 51, Jan. 1938, University of California, USA.
Trophy Time Tackle Lucky Leaders Monofilament Halibut Fishing Leaders, www.trophytimetackle.com, publication date unknown.
Bait Boats 4, Two Pole Yellowfin.jpg, Historic Fishing, wwwtest.astoria.k12.or.us/galley/view_photo.php?set_albu... (?), publication date unknown.

(Continued)

*Primary Examiner* — Son T. Nguyen
*Assistant Examiner* — Shadi Baniani
(74) *Attorney, Agent, or Firm* — Cameron IP

(57) ABSTRACT

The invention involves a fishing device used for operatively connecting a first fishing line and a second fishing line from a first fishing rod and a second fishing rod, respectively, to a hook. The fishing device includes a spreader bar having a first connector at a first end, a second connector at a second end, and a third connector interposed between the first end and the second end. The first connector is shaped to connect with the first fishing line. The second connector is shaped to connect with the second fishing line. The third connector is shaped to operatively connect with the hook. The spreader bar is shaped to remain streamline when pulled through a body of water. The spreader bar thereby acts to inhibit the first fishing line from entangling with the second fishing line.

5 Claims, 4 Drawing Sheets

OTHER PUBLICATIONS

"Tuna Fishing 1940's Pt. 1", http:www.youtube.com/watch?v=tM93Mg8rtBM&efeature=related, Time: 4:09-4:29.

"Tuna Fishing 1940's Pt. 2", http:www.youtube.com/watch?v=_xsybqHEdKA&feature=related, Time: 0:00-0:42.

* cited by examiner

DEVICE FOR CONNECTING TWO FISHING LINES

BACKGROUND OF THE INVENTION

Fishing with a single fishing rod and a single fishing line provides a number of drawbacks. If two people are fishing and only one person catches fish, the other person may be feel less skilled, unlucky, disappointed, and left out. If a fish is particularly large, such as a tuna, marlin, or sturgeon, such fish can be very difficult for a single person to reel in. This may be particularly true for women and children. Lastly, if the single fishing line breaks, the fish is lost.

Accordingly, there was a need for fishing with two fishing rods and this was provided by two-pole tuna fishing with a single hook. Two fishing lines from two separate fishing rods were attached through swivels to a common ring to which a snell and hook were fastened.

However, the fact that there were now three lines—the two fishing lines and the snell, resulted in a higher chance of line entanglement. When lines have a greater chance of being entangled, the hook has a higher chance of becoming obstructed in terms of position within the water and in terms of exposure to the fish, decreasing the chances of catching fish. The entanglement problem was further exasperated by the common ring. Because the common ring is small, the fishing lines of the above setup were very close together, promoting entanglement as a result of this proximity. Moreover, the common ring of the above setup typically had a round, small shape of very small cross-sectional surface area, and therefore passed through the water in a chaotic and erratic manner. This resulted in twirling, rotation, and flipping around and over of the lines, and therefore greater entanglement. This problem was further magnified in choppy seas, tidal current patterns, river currents and eddies.

There is accordingly a need for a fishing device for connecting the lines of two fishing rods to a single hook and that better inhibits fishing line entanglement and enhances fishing hook stability for a wide variety of water conditions.

BRIEF SUMMARY OF THE INVENTION

In response to the above drawbacks, there is provided a fishing device that has a rigid, V-shaped structure.

According to one aspect of the invention, there is provided a fishing device used for operatively connecting a first fishing line and a second fishing line from a first fishing rod and a second fishing rod, respectively, to a hook. The fishing device includes a spreader bar having a first connector at a first end, a second connector at a second end, and a third connector interposed between the first end and the second end. The first connector is shaped to connect with the first fishing line. The second connector is shaped to connect with the second fishing line. The third connector is shaped to operatively connect with the hook. The spreader bar is shaped to remain streamline when pulled through a body of water. The spreader bar thereby acts to inhibit the first fishing line from entangling with the second fishing line.

According to another aspect of the invention, there is provided a fishing rod assembly used for catching a fish in a body of water. The fishing rod assembly includes a first fishing rod having a first fishing line and a second fishing rod having a second fishing line. The fishing rod assembly includes a spreader bar that is rigid. The spread bar has a first connector at a first end, a second connector at a second end and a third connector interposed between the first end and the second end. The first connector is shaped to connect with the first fishing line of the first fishing rod. The second connector is shaped to connect with the second fishing line of the second fishing rod. The fishing rod assembly has a hook. The third connector is shaped to operatively connect with the hook. When the spreader bar and hook are placed in the body of water, the spreader bar inhibits the first fishing line and the second fishing line from becoming entangled. When fish is caught by the hook, both the first fishing rod and the second fishing rod may be used to reel in the fish.

According to a further aspect of the invention, there is provided a method of making a fishing device for connecting both a first fishing line from a first fishing rod and a second fishing line from a second fishing rod to a hook when fishing. The fishing device includes a rigid wire with a first wire end and a second wire end. The method includes twisting the first wire end so as to form a first loop at a first end of the fishing device. The first loop is thereby shaped to receive the first fishing line. The second wire end is then twisted so as to form a second loop at a second end of the fishing device. The second loop is thereby shaped to receive the second fishing line. The method includes next twisting the first end and the second end of the fishing device to form a third loop interposed between the first end and the second end. The third loop is thereby shaped to operatively receive the hook.

DESCRIPTION OF THE PREFERRED EMBODIMENTS

Figure 1:
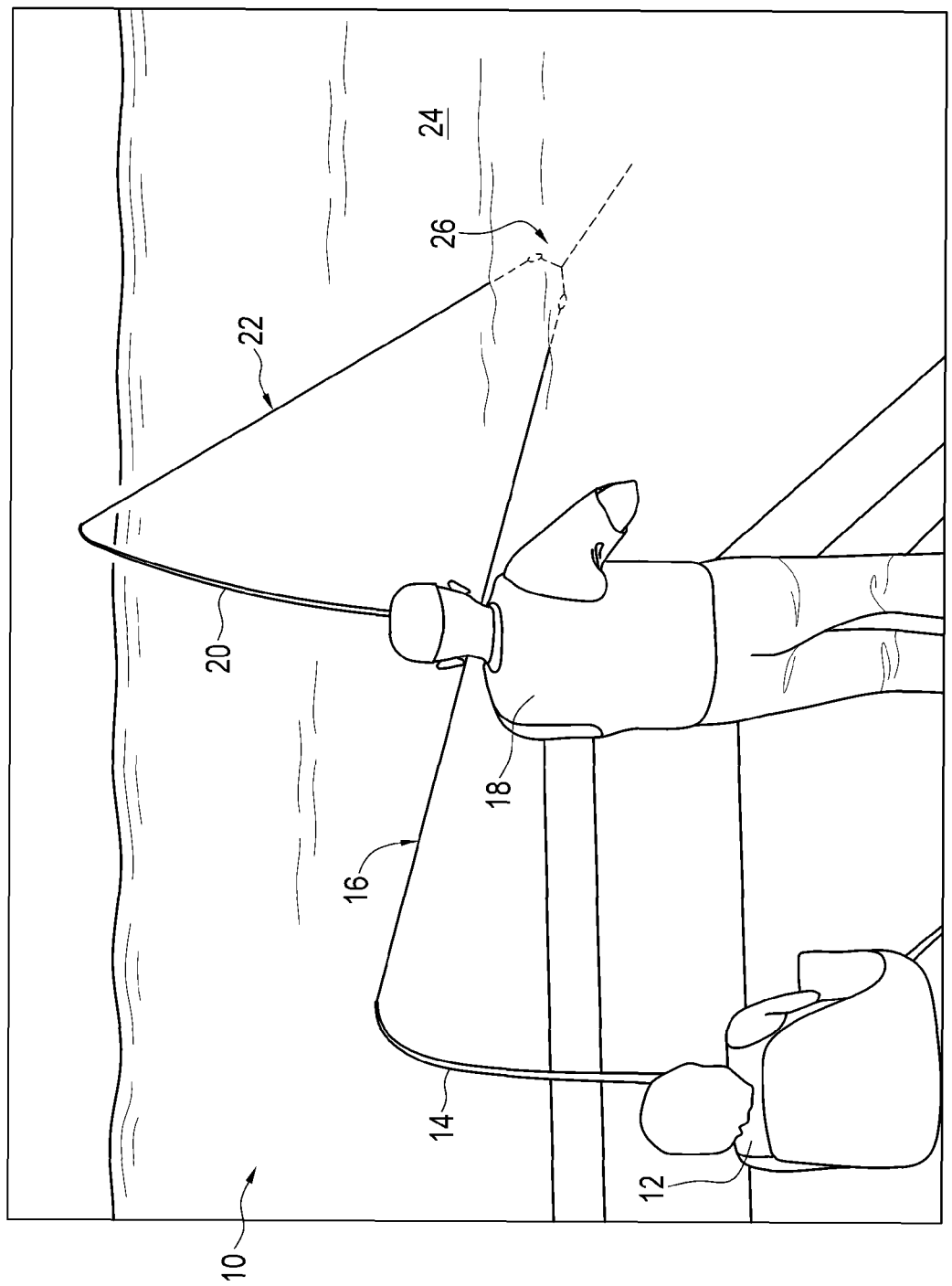
FIG. 1 is a perspective view of a fishing rod assembly with fishing device according to one aspect of the present invention, the assembly being illustrated in use by two fishers.

Referring to the drawings and first to FIG. 1, there is provided a fishing rod assembly 10. It includes a first fishing rod 14 controlled by a first person 12. The first fishing rod 14 has a first fishing line 16. The fishing rod assembly 10 includes a second fishing rod 20 controlled by a second person 18. The second fishing rod 20 has a second fishing line 22. A fishing device 26 located in a body of water 24 connects the first fishing line 16 and the second fishing line 20.

Figure 2:
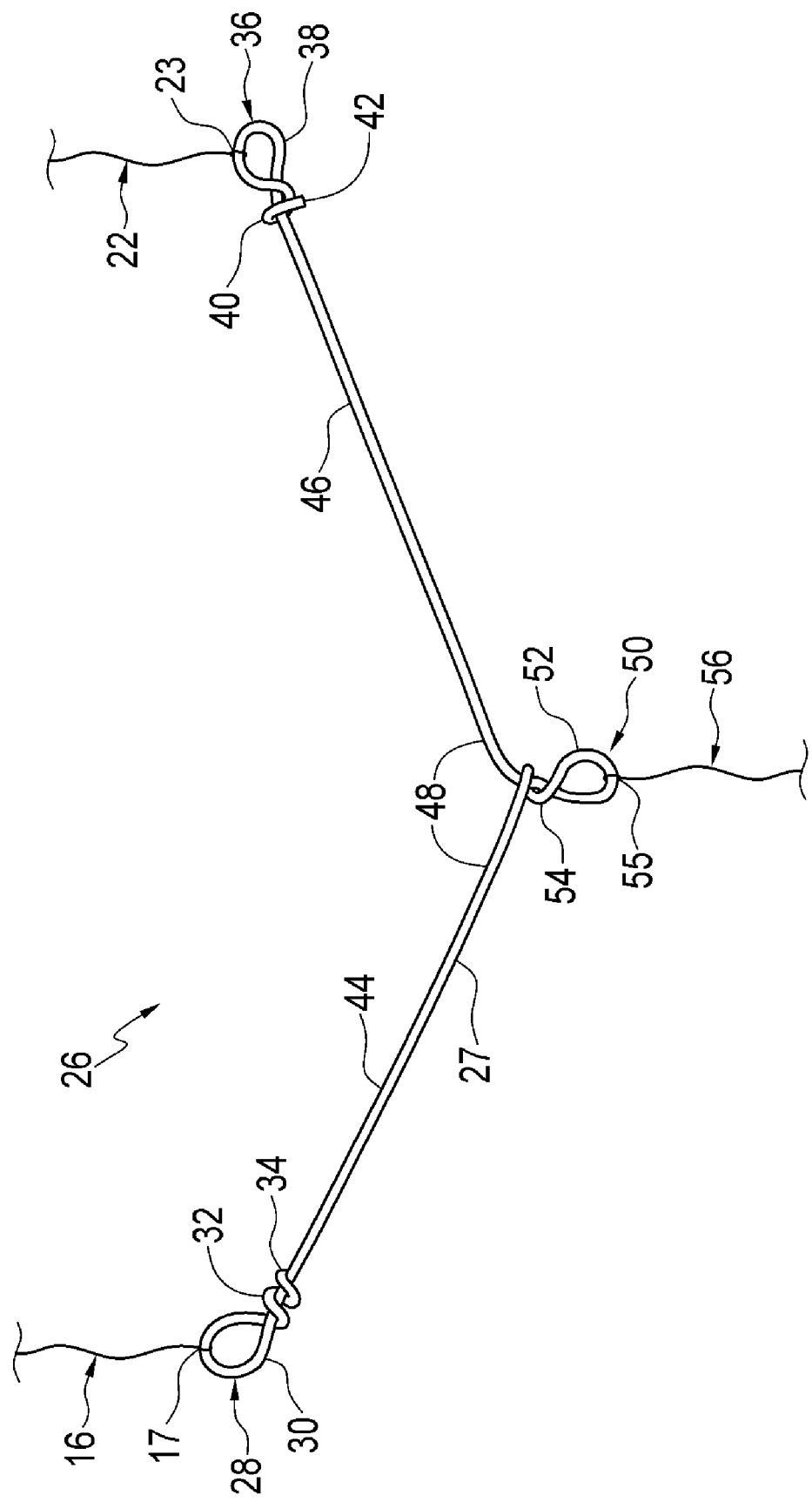
FIG. 2 is a top plan view of the fishing device of FIG. 1 illustrated in greater detail.

Referring now to FIG. 2, the fishing device 26 is illustrated in greater detail. The fishing device 26 in this example is made of a rigid wire 27. It includes a first connector 28 consisting of a loop or first loop portion 30. In this example, the first loop portion 30 is formed by twisting a first wire end 34 to form a first twisted portion 32 around a first arm 44 of the fishing device 26. The first fishing line 16 connects to the first loop portion 30 by way of a first fishing knot 17. The fishing device 26 includes a second connector 36 consisting of a second loop portion 38. The second loop portion 38 in this example is formed by twisting a second wire end 42 to form a second twisted portion around a second arm 46 of the fishing device 26. The first loop portion 30 and the second loop portion 38 are at outer ends of the arms 44 and 46. The second fishing line 22 connects to the second loop portion 38 by way of a second fishing knot 23. As shown in FIG. 2, the first arm and the second arm are aligned in the same plane. The second arm 46 is positioned at an angle 48 relative to the first arm 44. The angle 48 is an angle of less than 180 degrees, and in this preferred embodiment, an angle of about 135 degrees.

A third connector 50 is interposed between the first connector 28 and the second connector 36. In this example, the third connector 50 is space-apart equidistantly from and halfway between the first connector 28 and the second connector 36. The third connector 50 includes a third loop portion 52. The third loop portion 52 is formed by twisting the fishing device 26, thereby creating a third twisted portion 54. In this example, a snell 56 connects to the third loop portion 52 by way of a third fishing knot 55.

Figure 3:
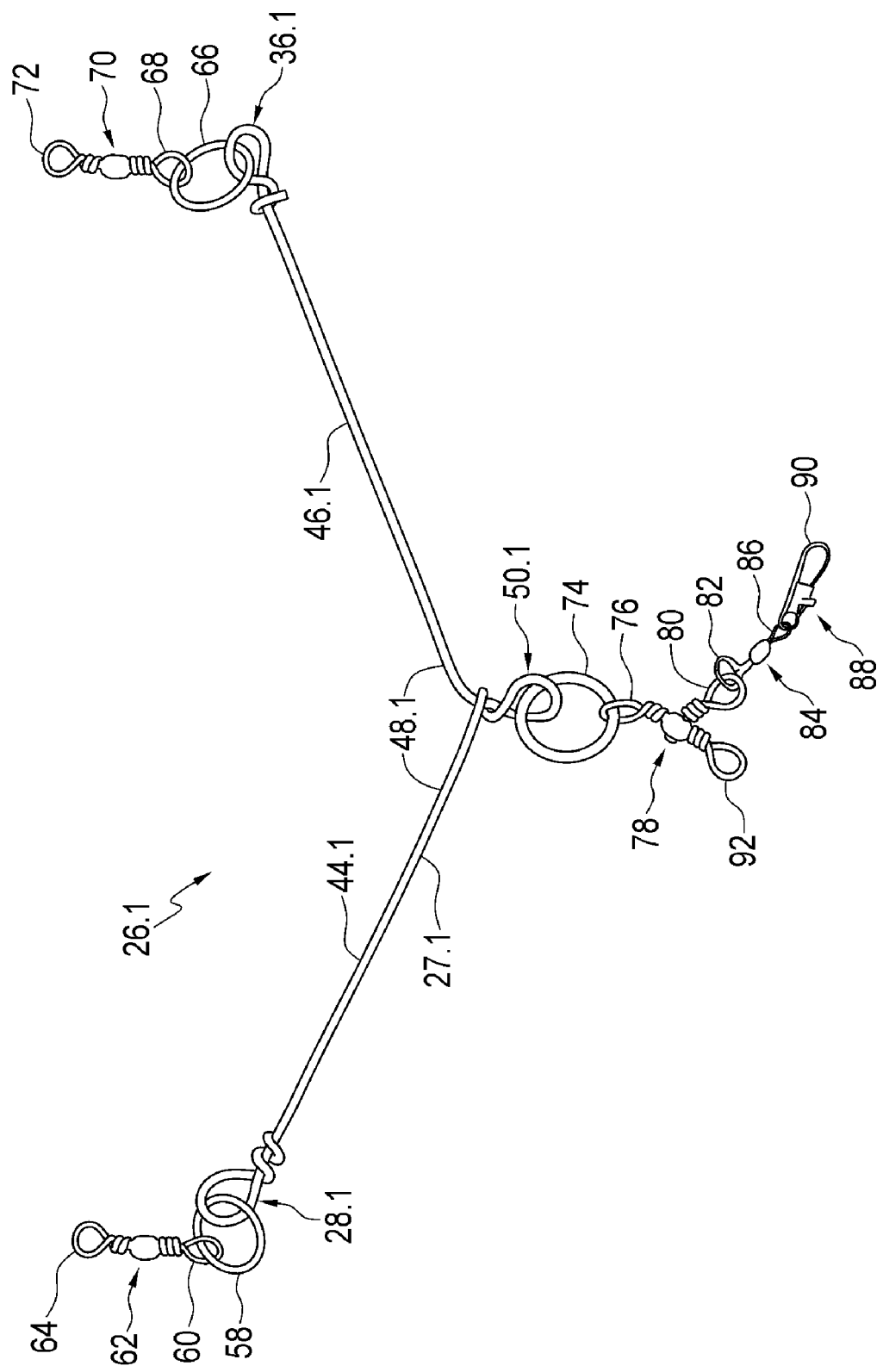
FIG. 3 is a top plan view similar to FIG. 2 according to another embodiment of the invention.
Figure 4:
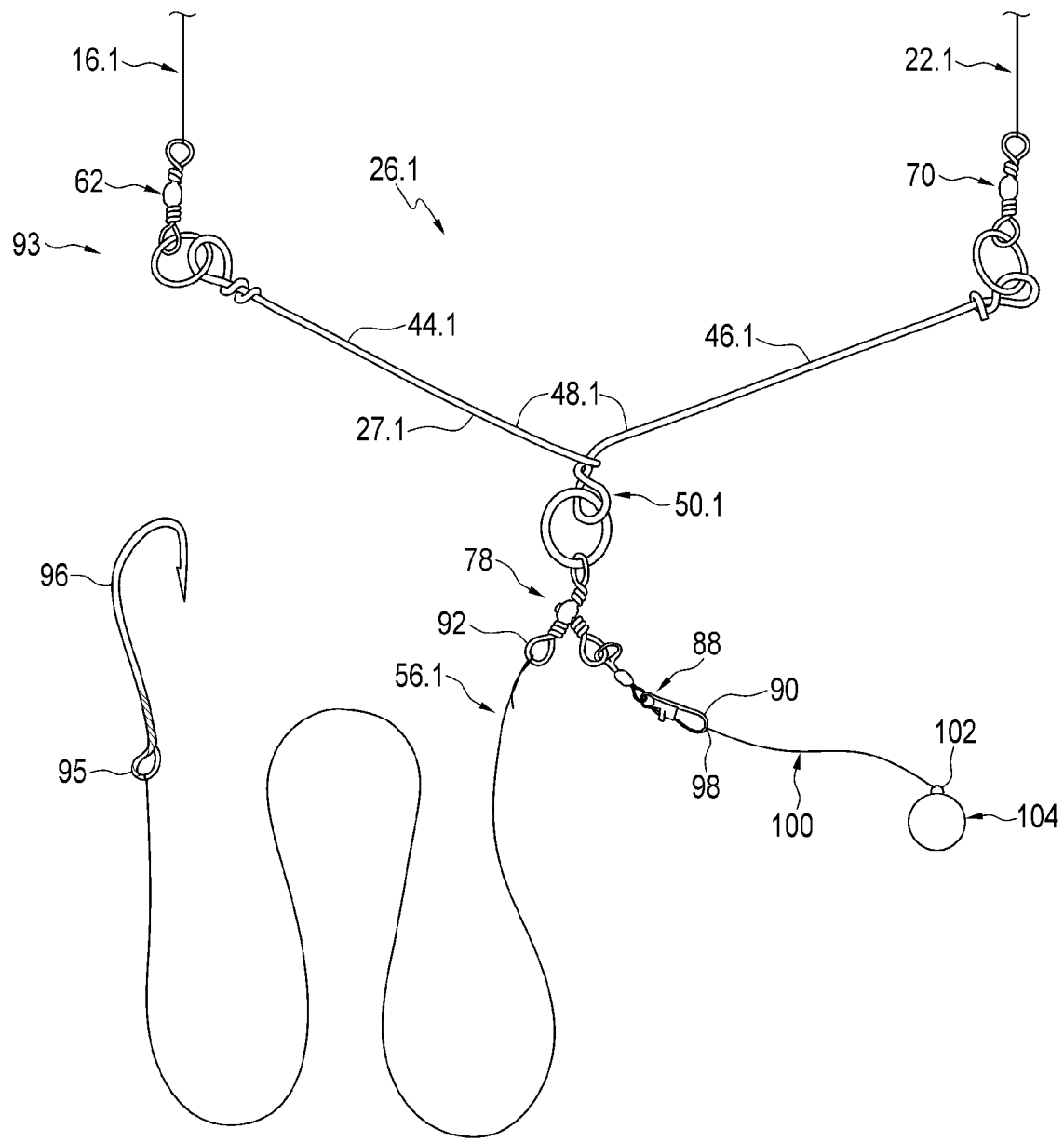
FIG. 4 is a top plan of the embodiment of FIG. 3 including a hook and weight.

Another embodiment of the present invention is illustrated in FIGS. 3 and 4, where like parts have like numbers with the addition of "0.1". Referring first to FIG. 3, the first connector 28.1 is connected to a first ring 58. A first swivel 62 having looped ends 60 and 64, respectively, connects to the first ring 58 at looped end 60. Looped end 64 is positioned to connect the first fishing line 16.1, as illustrated in FIG. 4. The second connector 36.1 is connected to a second ring 66. A second swivel 70 having looped ends 68 and 70, respectively, connects to the second ring 66 via looped end 68. Looped end 72 is positioned to connect with the second fishing line, as illustrated in FIG. 4. The third connector 50.1 connects to a third ring 74. A third swivel 78 has three looped ends 76, 80 and 92. The third swivel 78 connects to the third ring 74 via looped end 76. Looped end 92 is positioned to connect with the snell 56.1, which connects with the hook 96 by way of a fourth fishing knot 95. A fourth swivel 84 having looped ends 82 and 86, respectively, connects to the third swivel via looped ends 80 and 82. Looped end 86 connects with a spring clip 88 having eye 90. Eye 90 is positioned to connect with a weight line 100 via fifth fishing knot 98. The weight line 100 connects to a weight 104 by way of a sixth fishing knot 102.

In use and referring to FIGS. 1 and 2, the fishing device 26 may be pulled through the body of water 24 by reeling in the lines 16 and 22 or pulling the first fishing rod 14 and the second fishing rod 22. Both the rigidity and the angled shape of the fishing device 26 result in the first fishing line 16 remaining separate and apart from the second fishing line 22. The shape of the fishing device 26 results in it being streamline and therefore providing stability for the hook 96, illustrated in FIG. 4. Water passes against the first connector 28, the second connector 36, the first arm 34 and the second arm 46 in a controlled manner. The first arm 34 and the second arm 46 thereby act as stabilizing wings giving an even force distribution. The water may also be directed against and along the first arm 34 and the second arm 46 towards the third connector 50, further resulting in the even force distribution along the fishing device 26. This even force distribution resulting from the structure inhibits unequal tension on either the first fishing line 16 or the second fishing line 22. This even force distribution arising from the invention's structure inhibits wobbling and shaking of the fishing device 26. As a result of the above, the invention's streamline structure inhibits the device from twirling, rotating, flipping over and around, and therefore inhibits entangling of the lines 16, 22, and 56 and other components of the fishing device 26. In this embodiment, the fishing device 26 may use the weight of the rigid wire 27 as a further stabilizing device. The weight of the rigid wire 27 further provides the advantage of rendering a further weight unnecessary.

Referring to the embodiment illustrated in FIGS. 3 and 4, the swivels 62, 70, and 78 are positioned so as to further promote stability of the fishing device 26.1 by further inhibiting the device from twirling, rotating, flipping over and thus entangling of the fishing lines 16.1, 22.1, 56.1, and 100, and device 26.1. The weight 104 may promote greater ease of casting and sinking of the hook 96 to a desired location within the body of water 24.

Those skilled in the art will appreciate that a number of variations are possible. For example, instead of being made of a rigid wire, the fishing device 26 could be made of a bar, rod, or other such material, and may be in the form of a V-shaped member, a Y-shaped member comprising a V-shaped member with an elongate member extending therefrom, a T-shaped member, or other form that provides a rigid structure for separating the first connector 28 and the second connector 36. The fishing device 26 may be made of metal, composite, plastic or other such rigid material. Similarly, instead of being formed by twisting wire, the loop portions 28, 38, and 52 may be comprise eyes, ringlets, or other such shapes, which are cast, welded, or otherwise connected or formed as part of the fishing device 26. The rings 58, 66, and 74 may be key rings, slip rings or other such rings. In another variation, the fishing device may include the swivels and not include the ring 58, 66, and 74.

It will be understood by someone skilled in the art that many of the details provided above are by way of example only and are not intended to limit the scope of the invention which is to be determined with reference to the following claims.

What is claimed is:

1. A fishing device used for connecting a first fishing line from a first fishing rod and a second fishing line from a second fishing rod to a single hook, the fishing device comprising:

a rigid spreader bar having a first connector at a first end of the spreader bar, the first connector being shaped to connect with the first fishing line, a second connector at a second end of the spreader bar spaced-apart from the first end of the spreader bar, the second connector being shaped to connect with the second fishing line, and a third connector interposed between and spaced-apart equidistant from the first end of the spreader bar and the second end of the spreader bar, the third connector being shaped to operatively connect with the hook, the spreader bar including a first arm and a second arm, the first arm connecting the first connector and the third connector, the second arm connecting the third connector and the second connector, the first arm and the second arm being aligned in the same plane and the second arm being positioned at an angle of less than 180 degrees relative to the first arm, wherein the spreader bar has a V-shape and the first connector, the second connector and the third connector have being loop portions;

a first swivel having two looped ends;

a first ring connecting one of said two looped ends of said first swivel to said first connector;

a second swivel having two looped ends;

a second ring connecting one of said two looped ends of said second swivel to said second connector;

a third swivel having three looped ends;

a third ring connecting one of said three looped ends of said third swivel to said third connector;

a snell connected to one of said three looped ends of said third swivel;

a fourth swivel having two looped ends, one of said two looped ends connected to one of said three looped ends of said third swivel;

a spring clip connected to one of said two looped ends of said fourth swivel, said spring clip having an eye connected to a weight line of a weight;

whereby when the fishing device is pulled by the first fishing rod and the second fishing rod through the water via the first connector and the second connector, respectively, water passes against the first arm and the second arm in a controlled manner with the first arm and the second arm acting as stabilizing wings, inhibiting the first fishing line from the first fishing rod from entangling with the second fishing line from the second fishing rod.

2. The fishing device as claimed in claim 1, wherein the second arm is positioned at an angle of 135 degrees relative to the first arm.

3. In combination, a first fishing rod with a first fishing line, a second fishing rod with a second fishing line, a single hook and a fishing device used for connecting the first fishing line from the first fishing rod and the second fishing line from the second fishing rod to the single hook, the fishing device comprising:

a rigid spreader bar having a first connector at a first end of the spreader bar, the first connector being shaped to connect with the first fishing line, a second connector at a second end of the spreader bar spaced-apart from the first end of the spreader bar, the second connector being shaped to connect with the second fishing line, and a third connector interposed between and spaced-apart equidistant from the first end of the spreader bar and the second end of the spreader bar, the third connector being shaped to operatively connect with the hook, the spreader bar including a first arm and a second arm, the first arm connecting the first connector and the third connector, the second arm connecting the third connector and the second connector, the first arm and the second arm being aligned in the same plane and the second arm being positioned at an angle of less than 180 degrees relative to the first arm, wherein the spreader bar has a V-shape and the first connector, the second connector and the third connector have being loop portions;

a first swivel having two looped ends;
a first ring connecting one of said two looped ends of said first swivel to said first connector;
a second swivel having two looped ends;
a second ring connecting one of said two looped ends of said second swivel to said second connector;
a third swivel having three looped ends;
a third ring connecting one of said three looped ends of said third swivel to said third connector;
a snell connected to one of said three looped ends of said third swivel;
a fourth swivel having two looped ends, one of said two looped ends connected to one of said three looped ends of said third swivel;
a spring clip connected to one of said two looped ends of said fourth swivel, said spring clip having an eye connected to a weight line of weight;
whereby when the fishing device is pulled by the first fishing rod and the second fishing rod through the water via the first connector and the second connector, respectively, water passes against the first arm and the second arm in a controlled manner with the first arm and the second arm acting as stabilizing wings, inhibiting the first fishing line from the first fishing rod from entangling with the second fishing line from the second fishing rod.

4. The fishing device as claimed in claim 1, wherein the spreader bar is made of wire and the loop portions are twisted wire.

5. The combination as claimed in claim 3, wherein the spreader bar is made of wire and the loop portions are twisted wire.

\* \* \* \* \*

UNITED STATES PATENT AND TRADEMARK OFFICE
CERTIFICATE OF CORRECTION

PATENT NO. : 8,015,746 B2
APPLICATION NO. : 11/948324
DATED : September 13, 2011
INVENTOR(S) : John Throssell It is certified that error appears in the above-identified patent and that said Letters Patent is hereby corrected as shown below:

In the Claims:

Column 4, lines 27-67 and Column 5, lines 1-7, claim 1 should read:

1. A fishing device used for connecting a first fishing line from a first fishing rod and a second fishing line from a second fishing rod to a single hook, the fishing device comprising: a rigid spreader bar having a first connector at a first end of the spreader bar, the first connector being shaped to connect with the first fishing line, a second connector at a second end of the spreader bar spaced-apart from the first end of the spreader bar, the second connector being shaped to connect with the second fishing line, and a third connector interposed between and spaced-apart equidistant from the first end of the spreader bar and the second end of the spreader bar, the third connector being shaped to operatively connect with the hook, the spreader bar including a first arm and a second arm, the first arm connecting the first connector and the third connector, the second arm connecting the third connector and the second connector, the first arm and the second arm being aligned in the same plane and the second arm being positioned at an angle of less than 180 degrees relative to the first arm, wherein the spreader bar has a V-shape and the first connector, the second connector and the third connector being loop portions; a first swivel having two looped ends; a first ring connecting one of said two looped ends of said first swivel to said first connector; a second swivel having two looped ends; a second ring connecting one of said two looped ends of said second swivel to said second connector; a third swivel having three looped ends; a third ring connecting one of said three looped ends of said third swivel to said third connector; a snell connected to another of said three looped ends of said third swivel; a fourth swivel having two looped ends, one of said two looped ends of said fourth swivel connected to a further of said three looped ends of said third swivel; and a spring clip connected to another of said two looped ends of said fourth swivel, said spring clip having an eye connected to a weight line of a weight; whereby when the fishing device is pulled by the first fishing rod and the second fishing rod through the water via the first connector and the second connector, respectively, water passes against the first arm and the second arm in a controlled manner with the first arm and the second arm acting as stabilizing wings, inhibiting the first fishing line from the first fishing rod from entangling with the second fishing line from the second fishing rod.

Signed and Sealed this
Twenty-seventh Day of August, 2013

Teresa Stanek Rea
*Acting Director of the United States Patent and Trademark Office*

CERTIFICATE OF CORRECTION (continued)
U.S. Pat. No. 8,015,746 B2

Column 5, lines 11-34 and Column 6, lines 1-27, claim 3 should read:

3. In combination, a first fishing rod with a first fishing line, a second fishing rod with a second fishing line, a single hook and a fishing device used for connecting the first fishing line from the first fishing rod and the second fishing line from the second fishing rod to the single hook, the fishing device comprising: a rigid spreader bar having a first connector at a first end of the spreader bar, the first connector being shaped to connect with the first fishing line, a second connector at a second end of the spreader bar spaced-apart from the first end of the spreader bar, the second connector being shaped to connect with the second fishing line, and a third connector interposed between and
spaced-apart equidistant from the first end of the spreader bar and the second end of the spreader bar, the third connector being shaped to operatively connect with the hook, the spreader bar including a first arm and a second arm, the first arm connecting the first connector and the third connector, the second arm connecting the third connector and the second connector, the first arm and the second arm being aligned in the same plane and the second arm being positioned at an angle of less than 180 degrees relative to the first arm, wherein the spreader bar has a V-shape and the first connector, the second connector and the third connector being loop portions; a first swivel having two looped ends; a first ring connecting one of said two looped ends of said first swivel to said first connector; a second swivel having two looped ends; a second ring connecting one of said two looped ends of said second swivel to said second connector; a third swivel having three looped ends; a third ring connecting one of said three looped ends of said third swivel to said third connector; a snell connected to another of said three looped ends of said third swivel; a fourth swivel having two looped ends, one of said two looped ends of said fourth swivel connected to a further of said three looped ends of said third swivel; and a spring clip connected to another of said two looped ends of said fourth swivel, said spring clip having an eye connected to a weight line of weight; whereby when the fishing device is pulled by the first fishing rod and the second fishing rod through the water via the first connector and the second connector, respectively, water passes against the first arm and the second arm in a controlled manner with the first arm and the second arm acting as stabilizing wings, inhibiting the first fishing line from the first fishing rod from entangling with the second fishing line from the second fishing rod.